US012607571B2

(12) United States Patent
Fujioka et al.

(10) Patent No.: US 12,607,571 B2
(45) Date of Patent: Apr. 21, 2026

(54) VISUAL INSPECTION APPARATUS AND VISUAL INSPECTION METHOD

(71) Applicant: Hitachi Astemo, Ltd., Ibaraki (JP)

(72) Inventors: Takahiro Fujioka, Hitachinaka (JP); Hiroki Morii, Hitachinaka (JP); Takamasa Imaizumi, Hitachinaka (JP); Hiroyuki Hayashi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 224 days.

(21) Appl. No.: 18/267,517

(22) PCT Filed: Dec. 15, 2021

(86) PCT No.: PCT/JP2021/046167
§ 371 (c)(1),
(2) Date: Jun. 15, 2023

(87) PCT Pub. No.: WO2022/131279
PCT Pub. Date: Jun. 23, 2022

(65) Prior Publication Data
US 2024/0035986 A1 Feb. 1, 2024

(30) Foreign Application Priority Data
Dec. 17, 2020 (JP) ................................. 2020-209096

(51) Int. Cl.
*G01N 21/952* (2006.01)
*G06T 7/00* (2017.01)
(Continued)

(52) U.S. Cl.
CPC ......... *G01N 21/952* (2013.01); *G06T 7/0008* (2013.01); *G06V 10/141* (2022.01);
(Continued)

(58) Field of Classification Search
CPC ......... G01N 21/952; G01N 2021/9511; G01N 21/8806; G01N 21/9515; G06T 7/0008;
(Continued)

(56) References Cited

U.S. PATENT DOCUMENTS

| | | | | |
|---|---|---|---|---|
| 11,195,265 B2 * | 12/2021 | Kim | ...................... | G06N 3/084 |
| 2017/0154234 A1 * | 6/2017 | Tanaka | .................... | G06T 7/001 |
| 2017/0350827 A1 * | 12/2017 | Matsuda | ............ | G01N 21/8851 |

FOREIGN PATENT DOCUMENTS

| | | | | |
|---|---|---|---|---|
| CN | 112308854 A | * | 2/2021 | ......... G01N 21/8806 |
| JP | 11-051620 | | 2/1999 | |

(Continued)

OTHER PUBLICATIONS

International Search Report dated Mar. 1, 2022 in International Application No. PCT/JP2021/046167, with English-language translation.

(Continued)

*Primary Examiner* — Tarifur R Chowdhury
*Assistant Examiner* — Kemaya Nguyen
(74) *Attorney, Agent, or Firm* — Wenderoth, Lind & Ponack, L.L.P.

(57) ABSTRACT

A visual inspection apparatus of the present invention includes a rotational portion configured to rotate in a state that an inspection target is placed on the rotational portion, a mirror portion provided so as to reflect the inspection target in the state that the inspection target is placed on the rotational portion, an imaging portion configured to image the inspection target reflected in the mirror portion, an adjustment portion configured to change an imaging angle of the imaging portion relative to the inspection target reflected in the mirror portion, and an inspection portion configured to inspect a surface of the inspection target based on image data captured by the imaging portion.

9 Claims, 8 Drawing Sheets

(51) Int. Cl.
|  |  |
|---|---|
| *G06V 10/141* | (2022.01) |
| *G06V 10/60* | (2022.01) |
| *G01N 21/95* | (2006.01) |

(52) U.S. Cl.
CPC ...... *G06V 10/60* (2022.01); *G01N 2021/9511*
(2013.01); *G06T 2207/30164* (2013.01)

(58) Field of Classification Search
CPC . G06T 2207/30164; G06T 2207/10016; G06T
7/0004; G06V 10/141; G06V 10/60;
G06V 20/52
See application file for complete search history.

(56) References Cited

FOREIGN PATENT DOCUMENTS

| JP | 11-326235 | 11/1999 |
|---|---|---|
| JP | 2014-215059 | 11/2014 |
| JP | 2016-057122 | 4/2016 |
| JP | 2016-200420 | 12/2016 |
| JP | 2020-183896 | 11/2020 |
| JP | 2022028337 A * | 2/2022 |

OTHER PUBLICATIONS

Written Opinion of the International Searching Authority dated Mar.
1, 2022 in International Application No. PCT/JP2021/046167, with
English-language translation.

* cited by examiner

VISUAL INSPECTION APPARATUS AND VISUAL INSPECTION METHOD

TECHNICAL FIELD

The present invention relates to a visual inspection apparatus and a visual inspection method.

BACKGROUND ART

PTL 1 discloses a visual inspection apparatus including a rotational mechanism configured to rotate an inspection target around a central axis thereof, a reflection mechanism disposed on both sides in a rotational axis direction of this rotational mechanism and configured to reflect images of a top surface and a bottom surface of the inspection target so as to allow them to be viewed together with a side surface of the inspection target, an imaging portion configured to single-handedly image the side surface of the inspection target and mirror images formed with the aid of the reflection mechanism as a single inspection target image, and a processing portion configured to control operations of the rotational mechanism and the imaging portion and determine whether the captured inspection target image is appropriate or inappropriate.

CITATION LIST

Patent Literature

PTL 1: Japanese Patent Application Public Disclosure No. H11-51620

SUMMARY OF INVENTION

Technical Problem

However, although PTL 1 can inspect appearances of the surfaces of the inspection target viewed in the plurality of directions without including a complicated imaging mechanism by imaging the mirror images formed with the aid of the reflection mechanism, PTL 1 erroneously detects even just luminance unevenness on the surface as a defect if a portion exhibiting a low luminance is present in an image captured in a bright field region. This may necessitate a re-inspection, thereby leading to a reduction in productivity with respect to the visual inspection of the inspection target.

Further, it has been conventionally considered to swing an inspection target using an articulated robot to thus change a relative posture of an inspection portion of the inspection target relative to an imaging portion, thereby improving accuracy of distinguishing a defect and luminance unevenness on the surface and accurately conducting the visual inspection of the inspection target, but this may lead to a reduction in productivity due to an increase in inspection man-hours due to complication of an inspection facility.

Solution to Problem

One of objects of the present invention is to provide a visual inspection apparatus and a visual inspection method capable of achieving improvement of productivity with respect to an inspection of an inspection target by improving accuracy of distinguishing a defect and luminance unevenness on a surface and also curbing an increase in inspection man-hours due to complication of an inspection facility.

According to one aspect of the present invention, a visual inspection apparatus includes a rotational portion configured to rotate in a state that an inspection target is placed on the rotational portion, a mirror portion provided so as to reflect the inspection target in the state that the inspection target is placed on the rotational portion, an imaging portion configured to image the inspection target reflected in the mirror portion, an adjustment portion configured to change an imaging angle of the imaging portion relative to the inspection target reflected in the mirror portion, and an inspection portion configured to inspect a surface of the inspection target based on image data captured by the imaging portion.

According to the one aspect of the present invention, the visual inspection apparatus can achieve improvement of productivity with respect to an inspection of an inspection target by improving accuracy of distinguishing a defect and luminance unevenness on a surface and also curbing an increase in inspection man-hours due to complication of an inspection facility.

DESCRIPTION OF EMBODIMENTS

First Embodiment

Figure 1:
FIG. 1 illustrates a process of manufacturing a piston of an internal combustion engine.

FIG. 1 illustrates a process of manufacturing a piston of an internal combustion engine.

The process of manufacturing the piston includes a casting process, a machining process, a surface treatment process, a visual inspection process, and an assembling process.

In the casting process, a piston material is cast. After being cast, the piston material is thermally treated.

In the machining process, the piston material is machined by a turning machine or the like after being thermally treated.

In the surface treatment process, the surface of the piston is coated.

In the visual inspection process, a defective (a scratch, a dent, or the like) portion is detected on a crown surface (a surface) of the processed finished product of the piston.

In the assembling process, a piston ring is attached to a ring groove of the processed finished product of the piston.

Figure 2:
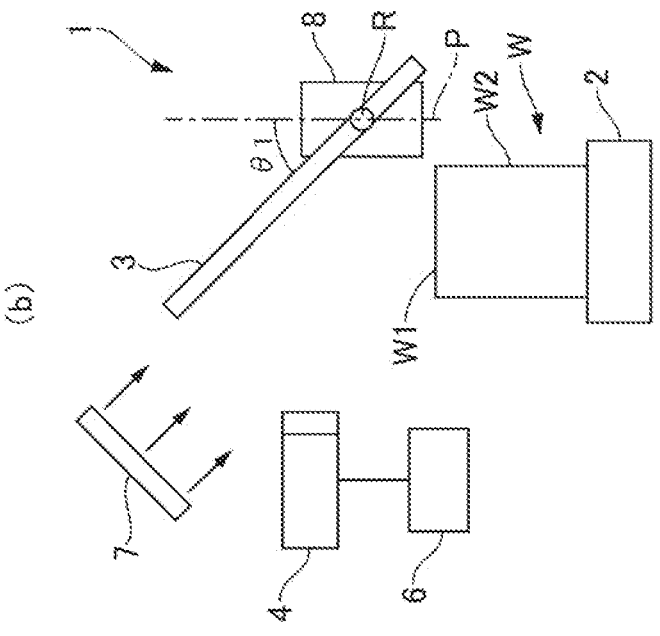
FIG. 2(a) is a schematic front view illustrating an outline of the configuration of a visual inspection apparatus at the time of frontal imaging according to a first embodiment.
FIG. 2(b) is a schematic side view illustrating the outline of the configuration of the visual inspection apparatus at the time of the frontal imaging according to the first embodiment.
Figure 2:
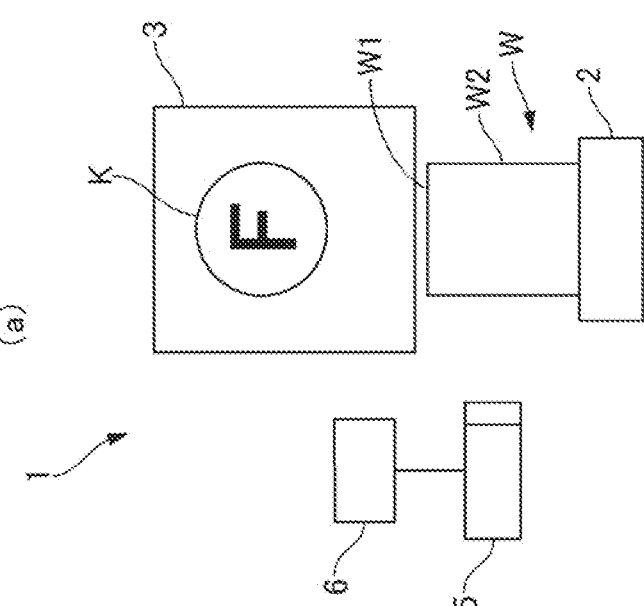
Figure 3:
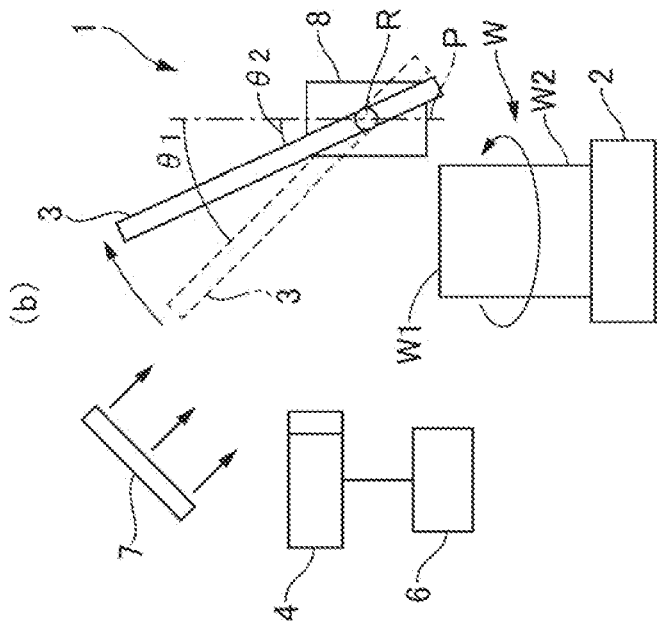
FIG. 3(a) is a schematic front view illustrating an outline of the configuration of the visual inspection apparatus at the time of inclined imaging according to the first embodiment.
FIG. 3(b) is a schematic side view illustrating the outline of the configuration of the visual inspection apparatus at the time of the inclined imaging according to the first embodiment.
Figure 3:
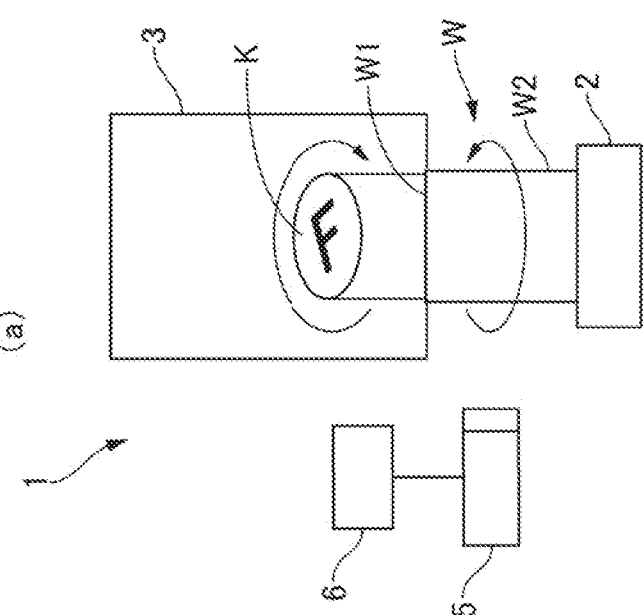

FIG. 2(*a*) is a schematic front view illustrating an outline of the configuration of a visual inspection apparatus at the time of frontal imaging according to a first embodiment. FIG. 2(*b*) is a schematic side view illustrating the outline of the configuration of the visual inspection apparatus at the time of the frontal imaging according to the first embodiment. FIG. 3(*a*) is a schematic front view illustrating an outline of the configuration of the visual inspection apparatus at the time of inclined imaging according to the first embodiment. FIG. 3(*b*) is a schematic side view illustrating the outline of the configuration of the visual inspection apparatus at the time of the inclined imaging according to the first embodiment.

The visual inspection apparatus 1 includes a rotational table (a rotational portion) 2, a mirror (a mirror portion) 3, a front camera (an imaging portion) 4, a side camera 5 (the imaging portion), a control device (an inspection portion) 6, an illumination device (an illumination portion) 7, and a first posture adjustment portion (an adjustment portion) 8.

The rotational table 2 rotates in a state that the piston (an inspection target) W is placed thereon.

The mirror 3 is installed so as to reflect a crown surface W1 of the piston W in the state that the piston W is placed on the rotational table 2.

The front camera 4 captures a mirror image K of the crown surface W1 of the piston W reflected in the mirror 3.

At the time of the frontal imaging, the mirror image K of the crown surface W1 of the piston W reflected in the mirror 3 is captured once in a state that the piston W is placed on the rotational table 2 and the rotational table 2 is not rotated.

Further, at the time of the inclined imaging, the mirror image K of the crown surface W1 of the piston W reflected in the mirror 3 is captured a plurality of times in a state that the piston W is placed on the rotational table 2 and the rotational table 2 is rotated in a direction indicated by an arrow.

The mirror image K of the crown surface W1 of the piston W is labeled with the symbol F to make the rotational position easily understood.

The side camera 5 images a side surface W2 of the piston W placed on the rotational table 2.

The control device 6 performs image processing on a plurality of pieces of image data captured by the front camera 4, and conducts the surface inspection of the crown surface W1 of the piston W based on the plurality of pieces of image data after the image processing, thereby determining whether a defect (a scratch or a dent) is present on the crown surface W1.

The illumination device 7 irradiates the crown surface W1 and the side surface W2 of the piston W with light.

The first posture adjustment portion 8 rotates a rotationally central shaft R, thereby changing the posture of the mirror 3 with respect to a vertical line P and thus changing an imaging angle of the crown surface W1 of the piston W.

The angle of the mirror 3 with respect to the vertical line P is set to an angle θ1 at the time of the frontal imaging, and is set to an angle θ2 (θ1>θ2) at the time of the inclined imaging by rotating the mirror 3 from the position at the time of the frontal imaging that is indicated by a broken line in a direction indicated by an arrow as illustrated in FIG. 3(*b*).

Figure 4:
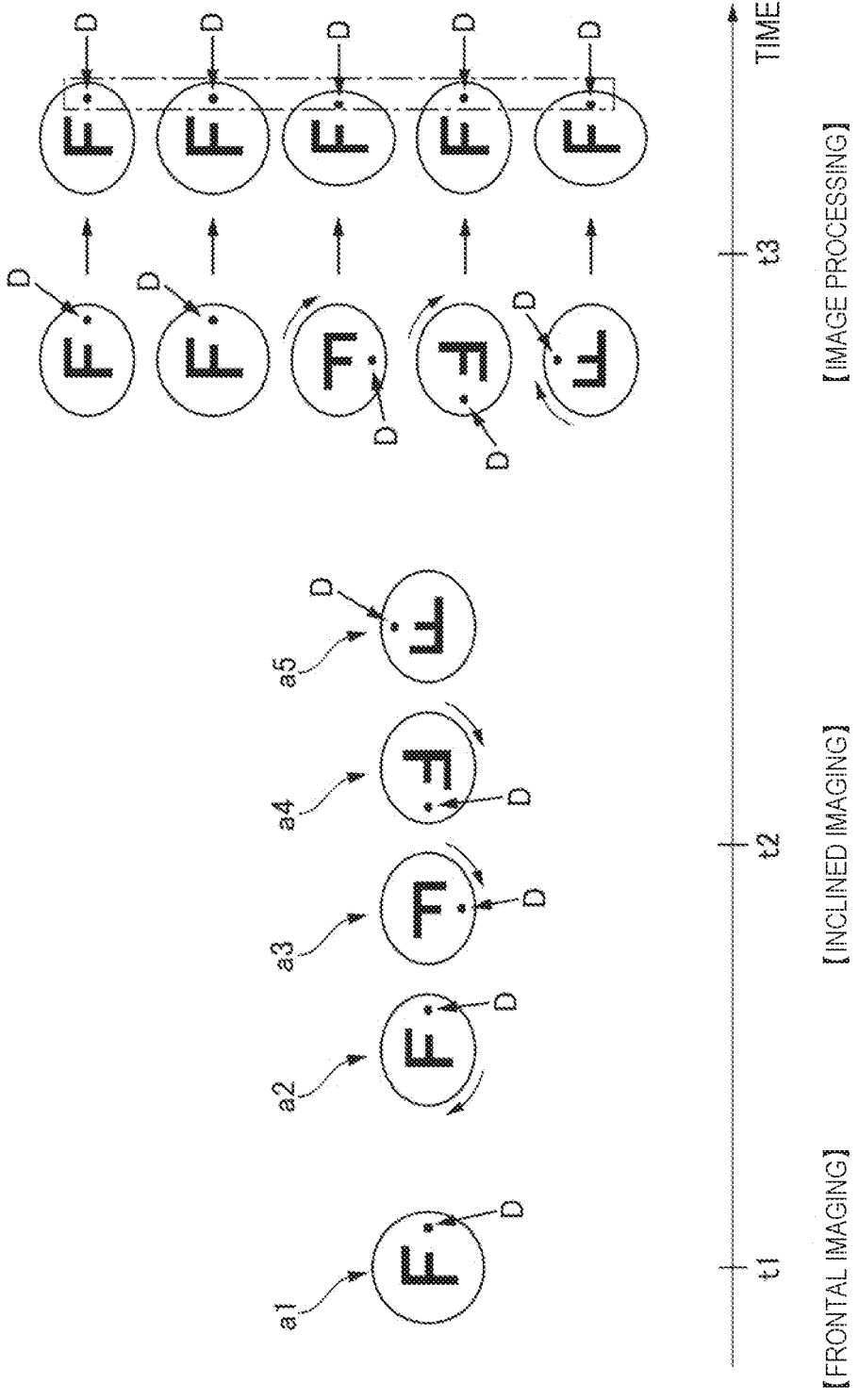
FIG. 4 is a timing chart illustrating operation examples of the frontal imaging, the inclined imaging, and image processing by the visual inspection apparatus according to the first embodiment.

FIG. 4 is a timing chart illustrating operation examples of the frontal imaging, the inclined imaging, and the image processing by the visual inspection apparatus according to the first embodiment.

At time t1, the control device 6 acquires one piece of first image data a1 by carrying out the frontal imaging of capturing the mirror image K reflected in the mirror 3 located at the angle θ1 with respect to the vertical line P.

The symbol D indicates a defect candidate.

Next, at time t2, the control device 6 acquires four pieces of image data, namely, second image data a2, third image data a3, fourth image data a4, and fifth image data a5 by carrying out the inclined imaging of capturing the mirror image K reflected in the mirror 3 located at the angle θ2 with respect to the vertical line P while rotating the rotational table 2.

At time t3, the image processing is performed.

More specifically, rotational processing is performed to cause the five pieces of image data a1, a2, a3, a4, and a5 to face the same direction in such a manner that the five pieces of image data a1, a2, a3, a4, and a5 acquired by the control device 6 are set with the respective defect candidates D in alignment with one another.

As a result, the position of the defect candidate D is less moved in the image data, and this facilitates grouping by inspection software and allows the control device 6 to identify that the defect candidate D is not luminance unevenness but is a defect (a scratch or a dent).

Next, advantageous effects of the first embodiment will be described.

(1) The visual inspection apparatus 1 is configured to include the rotational table 2 configured to rotate in the state that the piston W is placed on the rotational table 2, the mirror 3 provided so as to reflect the crown surface W1 of the piston W in the state that the piston W is placed on the rotational table 2, the front camera 4 configured to image the crown surface W1 of the piston W reflected in the mirror 3, the first posture adjustment portion 8 configured to change the posture of the mirror 3 relative to the crown surface W1 of the piston W, and the control device 6 configured to conduct the surface inspection of the crown surface W1 of the piston W based on the image data captured by the front camera 4.

Therefore, the first embodiment can achieve the improvement of productivity with respect to the inspection of the piston W by improving accuracy of distinguishing a defect and luminance unevenness on the surface of the crown surface W1 of the piston W1 and also curbing an increase in inspection man-hours due to the complication of the inspection facility.

Second Embodiment

Figure 5:
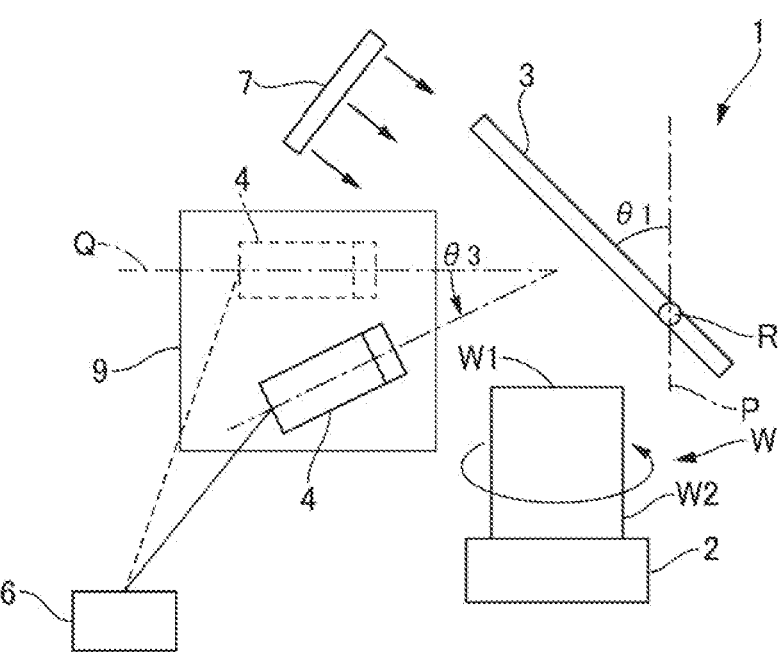
FIG. 5 is a schematic side view illustrating an outline of the configuration of a visual inspection apparatus at the time of frontal imaging and inclined imaging according to a second embodiment.

FIG. 5 is a schematic side view illustrating an outline of the configuration of a visual inspection apparatus at the time of frontal imaging and inclined imaging according to a second embodiment.

In the first embodiment, the visual inspection apparatus 1 is configured to rotate the rotationally central shaft R using the first posture adjustment portion 8, thereby changing the posture of the mirror 3 with respect to the vertical line P and thus changing the imaging angle of the crown surface W1 of the piston W. On the other hand, in the second embodiment, the visual inspection apparatus is configured to keep the posture of the mirror 3 with respect to the vertical line P fixed, and change the posture of the front camera 4 using a second posture adjustment portion (the adjustment portion) 9, thereby changing the imaging angle of the crown surface W1 of the piston W.

More specifically, the visual inspection apparatus is configured to change the posture of the front camera 4 to a position of the front camera 4 at the time of the frontal imaging that is indicated by a broken line in parallel with a horizontal line Q, and a position of the front camera 4 at the time of the inclined imaging that is indicated by a solid line below the horizontal line Q by an angle $\theta3$.

Other than that, the second embodiment is configured similarly to the first embodiment, and therefore similar components are identified by the same reference numerals and the descriptions thereof are omitted.

Accordingly, the second embodiment brings about similar advantageous effects to the first embodiment.

Third Embodiment

Figure 6:
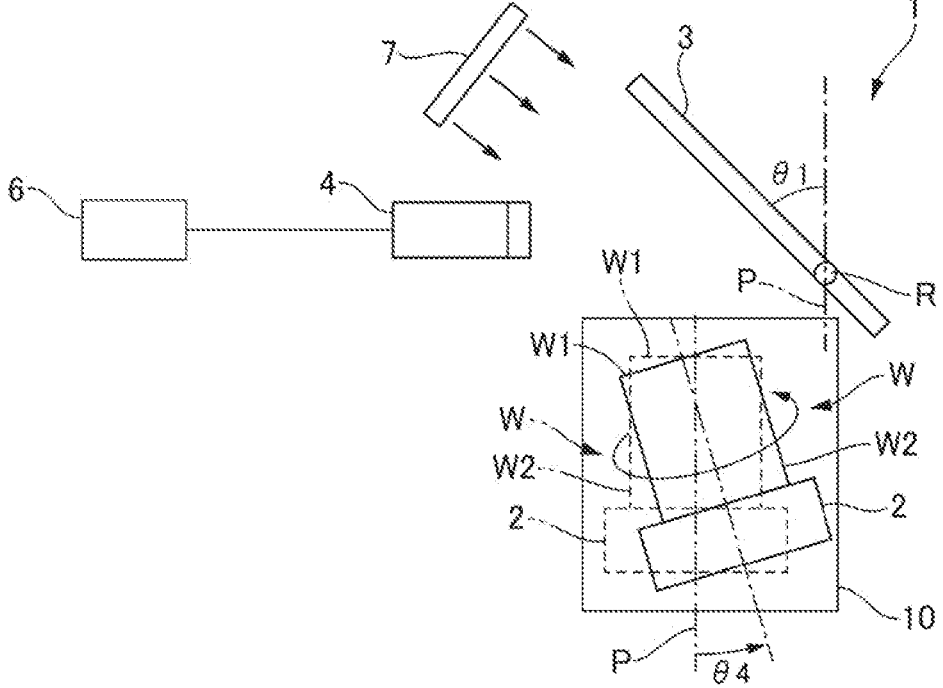
FIG. 6 is a schematic side view illustrating an outline of the configuration of a visual inspection apparatus at the time of frontal imaging and inclined imaging according to a third embodiment.

FIG. 6 is a schematic side view illustrating an outline of the configuration of a visual inspection apparatus at the time of frontal imaging and inclined imaging according to a third embodiment.

In the first embodiment, the visual inspection apparatus 1 is configured to rotate the rotationally central shaft R using the first posture adjustment portion 8, thereby changing the posture of the mirror 3 with respect to the vertical line P and thus changing the imaging angle of the crown surface W1 of the piston W. On the other hand, in the third embodiment, the visual inspection apparatus is configured to keep the posture of the mirror 3 with respect to the vertical line P fixed, and change the posture of the rotational table 2 using a third posture adjustment portion (the adjustment portion) 10, thereby changing the imaging angle of the crown surface W1 of the piston W.

More specifically, the visual inspection apparatus is configured to change the posture of the rotational table 2 to a position of the rotational table 2 at the time of the frontal imaging that is indicated by a broken line in parallel with the vertical line P, and a position of the rotational table 2 at the time of the inclined imaging that is indicated by a solid line to the right from the vertical line P by an angle $\theta4$.

Other than that, the third embodiment is configured similarly to the first embodiment, and therefore similar components are identified by the same reference numerals and the descriptions thereof are omitted.

Accordingly, the third embodiment brings about similar advantageous effects to the first embodiment.

Fourth Embodiment

Figure 7:
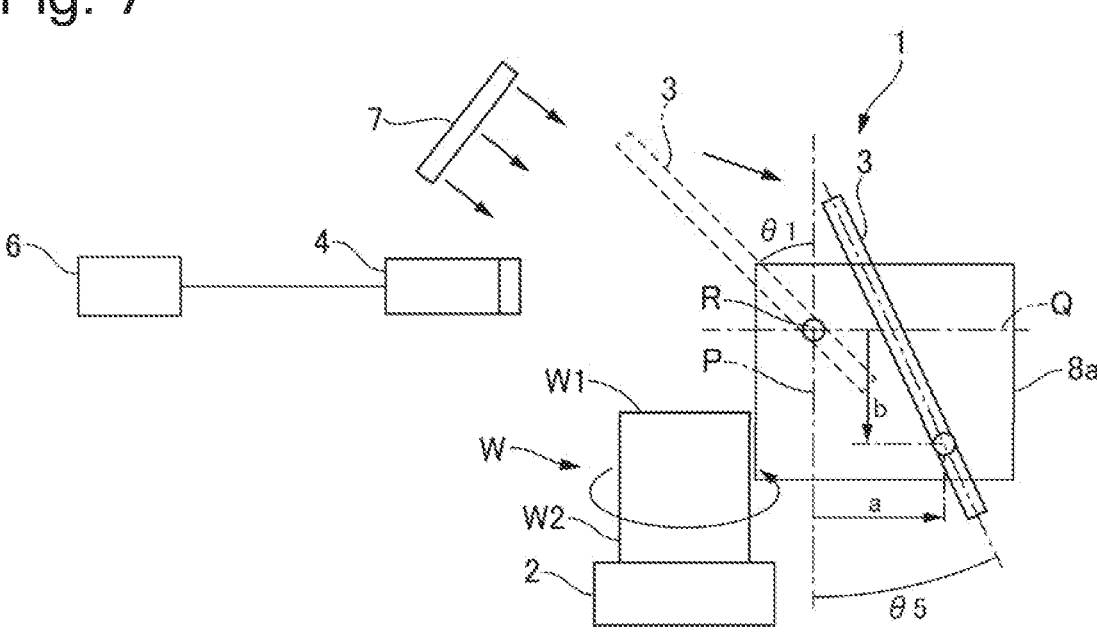
FIG. 7 is a schematic side view illustrating an outline of the configuration of a visual inspection apparatus at the time of frontal imaging and inclined imaging according to a fourth embodiment.

FIG. 7 is a schematic side view illustrating an outline of the configuration of a visual inspection apparatus at the time of frontal imaging and inclined imaging according to a fourth embodiment.

In the first embodiment, the visual inspection apparatus is configured to rotate the rotationally central shaft R using the first posture adjustment portion 8, thereby changing the posture of the mirror 3 with respect to the vertical line P and thus changing the imaging angle of the crown surface W1 of the piston W. On the other hand, in the fourth embodiment, the visual inspection apparatus is configured to, using a first posture adjustment portion 8a, rotate the rotationally central shaft R to thus change the posture of the mirror 3 with respect to the vertical line P, and also change the position of the rotationally central shaft R, thereby changing the imaging angle of the crown surface W1 of the piston W.

More specifically, the visual inspection apparatus is configured to change the mirror 3 to a position of the mirror 3 at the time of the frontal imaging that is indicated by a broken line located at the angle $\theta1$ with respect to the vertical line P, and a position of the mirror 3 at the time of the inclined imaging that is indicated by a solid line acquired by rotating the rotationally central shaft R to thus change the mirror 3 to the angle $\theta2$ with respect to the vertical line P and also shifting the rotationally central shaft R in parallel with the horizontal line Q by a distance a and downward in parallel with the vertical line P by a distance b.

Other than that, the fourth embodiment is configured similarly to the first embodiment, and therefore similar components are identified by the same reference numerals and the descriptions thereof are omitted.

Accordingly, in addition to the advantageous effects of the first embodiment, the fourth embodiment allows the position and the size of the mirror image to be precisely controlled, and therefore can further improve accuracy of distinguishing a defect and luminance unevenness on the surface of the crown surface W1 of the piston W.

Fifth Embodiment

Figure 8:
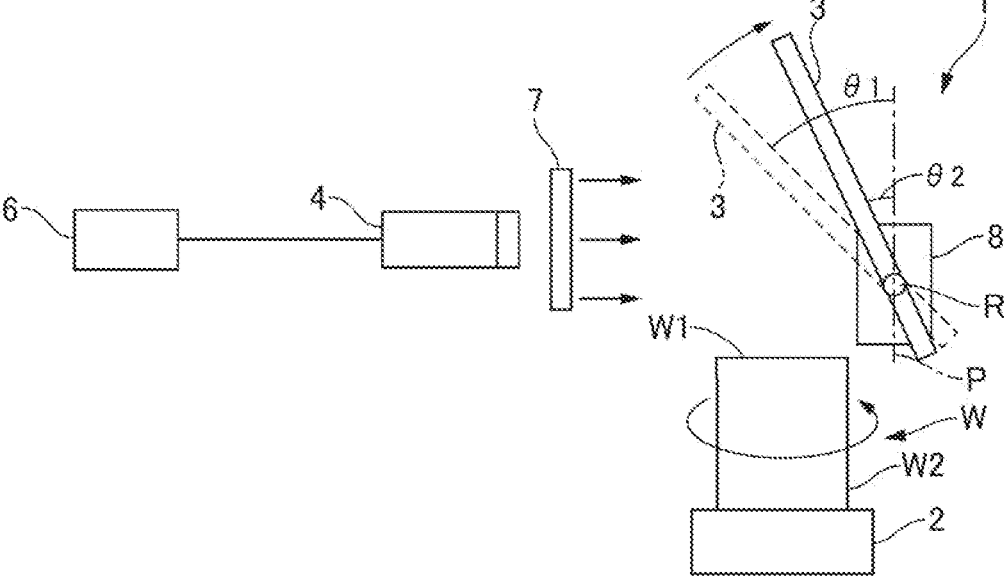
FIG. 8 is a schematic side view illustrating an outline of the configuration of a visual inspection apparatus at the time of frontal imaging and inclined imaging according to a fifth embodiment.

FIG. 8 is a schematic side view illustrating an outline of the configuration of a visual inspection apparatus at the time of frontal imaging and inclined imaging according to a fifth embodiment.

In the first embodiment, the illumination device 7 is configured to irradiate the crown surface W1 and the side surface W2 of the piston W with light from above the front camera 4. On the other hand, in the fifth embodiment, the illumination device 7 is configured to irradiate the crown surface W1 and the side surface W2 of the piston W while being disposed coaxially with the front camera 4.

Other than that, the fifth embodiment is configured similarly to the first embodiment, and therefore similar components are identified by the same reference numerals and the descriptions thereof are omitted.

Accordingly, in addition to the advantageous effects of the first embodiment, the fifth embodiment allows the front camera 4 and the illumination device 7 to be disposed coaxially and therefore can reduce an image change (variation) due to misalignment between the axis of the front camera 4 and the axis of the illumination device 7 that might occur at the time of the installation or might be caused by a change over time.

Sixth Embodiment

Figure 9:
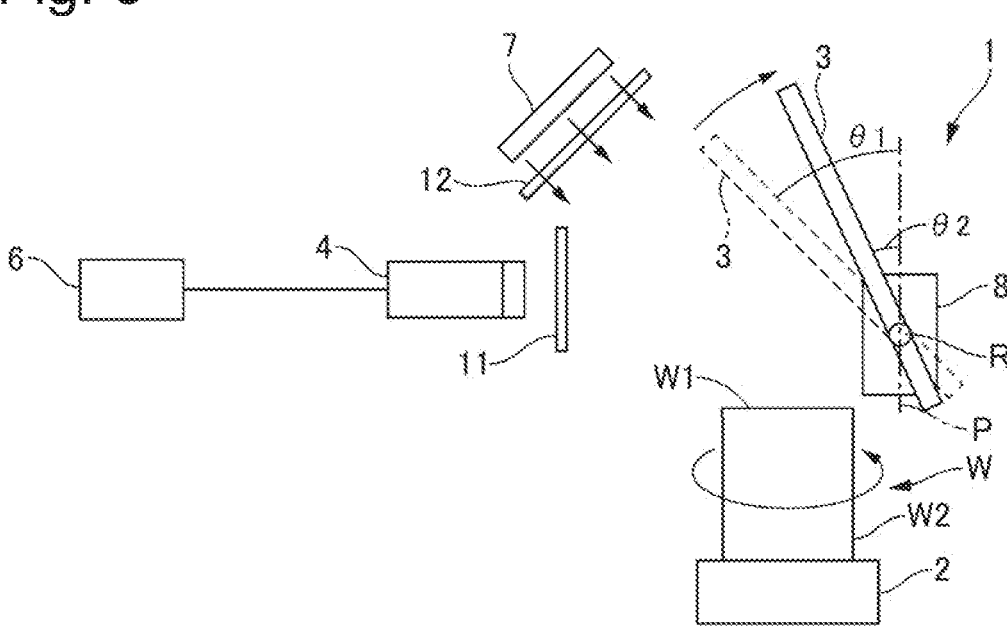
FIG. 9 is a schematic side view illustrating an outline of the configuration of a visual inspection apparatus at the time of frontal imaging and inclined imaging according to a sixth embodiment.

FIG. 9 is a schematic side view illustrating an outline of the configuration of a visual inspection apparatus at the time of frontal imaging and inclined imaging according to a sixth embodiment.

The sixth embodiment is configured in such a manner that a first polarizer 11 is disposed coaxially with the front camera 4 and a second polarizer 12 is disposed coaxially with the illumination device 7 in addition to the configuration according to the first embodiment.

Other than that, the sixth embodiment is configured similarly to the first embodiment, and therefore similar components are identified by the same reference numerals and the descriptions thereof are omitted.

Accordingly, in addition to the advantageous effects of the first embodiment, the sixth embodiment allows light reflected from a metallic surface to be reduced and adjusted to brightness close to a non-metallic surface by appropriately adjusting a polarizing axis using polarized illumination, thereby allowing surfaces made from different materials to be inspected all at once and thus contributing to further reducing the inspection time.

Seventh Embodiment

Figure 10:
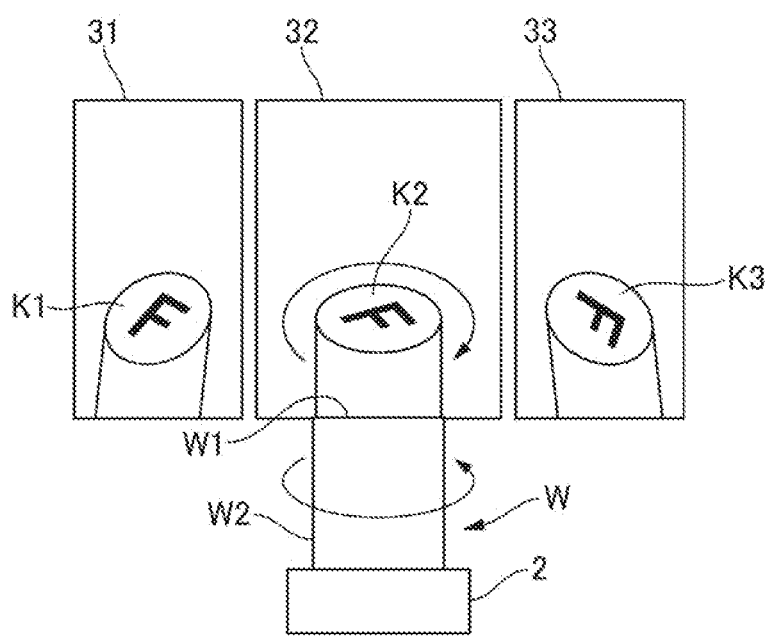
FIG. 10 is a schematic front view illustrating an outline of the configuration of a visual inspection apparatus at the time of frontal imaging and inclined imaging according to a seventh embodiment.

FIG. 10 is a schematic side view illustrating an outline of the configuration of a visual inspection apparatus at the time of frontal imaging and inclined imaging according to a seventh embodiment.

In the first embodiment, one mirror is disposed in front of the front camera 4. On the other hand, in the seventh embodiment, the visual inspection apparatus is configured in such a manner that three mirrors, namely, a first mirror 31, a second mirror 32, and a third mirror 33 are disposed in front of the front camera 4.

Other than that, the seventh embodiment is configured similarly to the first embodiment, and therefore similar components are identified by the same reference numerals and the descriptions thereof are omitted.

Accordingly, in addition to the advantageous effects of the first embodiment, the seventh embodiment allows the visual inspection apparatus to capture images at a plurality of angles, namely, a first mirror image K1 of the first mirror 31, a second mirror image K2 of the second mirror 32, and a third mirror image K3 of the third mirror 33 all at once, thereby contributing to further reducing the inspection time.

Eighth Embodiment

Figure 11:
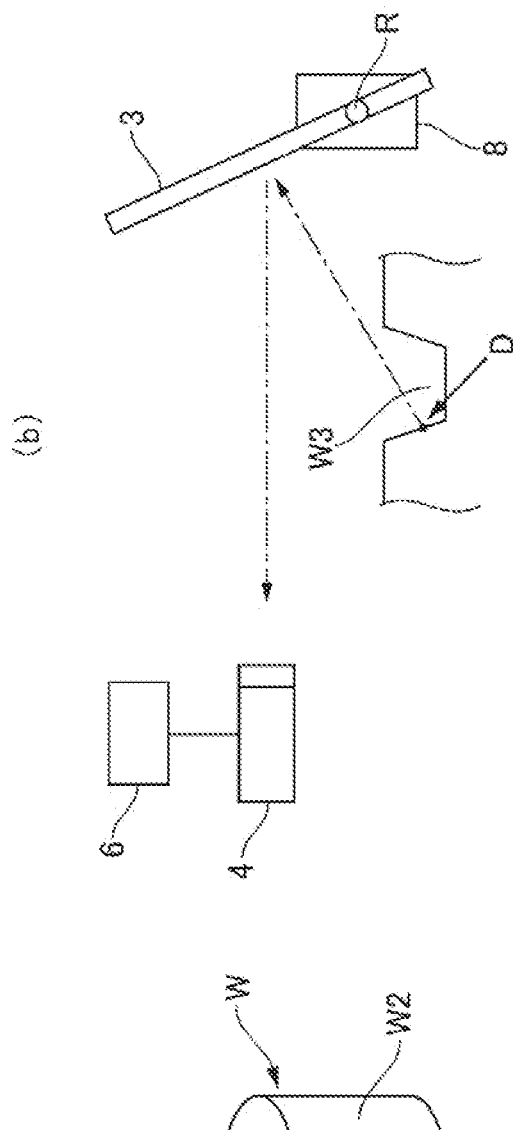
FIG. 11(*a*) is a perspective view of a piston according to an eighth embodiment, and FIG. 11(*b*) is a schematic side view illustrating an outline of the configuration of a visual inspection apparatus at the time of imaging according to the eighth embodiment.

FIG. 11(*a*) is a perspective view of a piston according to an eighth embodiment, and FIG. 11(*b*) is a schematic side view illustrating an outline of the configuration of a visual inspection apparatus at the time of imaging according to the eighth embodiment.

A recess W3 is formed on the crown surface W1 of the piston W according to the eighth embodiment.

Other than that, the eighth embodiment is configured similarly to the first embodiment, and therefore similar components are identified by the same reference numerals and the descriptions thereof are omitted.

Accordingly, in addition to the advantageous effects of the first embodiment, the eighth embodiment can bring about the following advantageous effect. Normally, the defect candidate D cannot be imaged when being present on the side surface of the recess W3 in the case where the inspection target is imaged from above by a camera. However, since the inspection target is imaged by the front camera 4 via the mirror 3, even the defect candidate D on the inner surface of the recess W3 can be reliably imaged.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention.

The seventh embodiment has been described assuming that the three mirrors are disposed, but a further larger number of mirrors can be disposed.

The visual inspection apparatus and the visual inspection method according to the present invention are applicable to a visual inspection apparatus and a visual inspection method for distinguishing a defect and luminance unevenness on a surface other than the crown surface of the piston as the surface of the inspection target, and bring about advantageous effects similar to the embodiments.

Further, the piston has been described as the inspection target, but the visual inspection apparatus and the visual inspection method according to the present invention are also applicable to a visual inspection apparatus and a visual inspection method for distinguishing a defect and luminance unevenness on a surface of another product, and bring about advantageous effects similar to the embodiments.

In the following description, technical ideas recognizable from the above-described embodiments will be described.

A visual inspection apparatus, according to one configuration thereof, is a visual inspection apparatus configured to inspect a surface of an inspection target. The visual inspection apparatus includes a rotational portion configured to rotate in a state that the inspection target is placed on the rotational portion, a mirror portion provided so as to reflect the inspection target in the state that the inspection target is placed on the rotational portion, an imaging portion configured to image the inspection target reflected in the mirror portion, an adjustment portion configured to change an imaging angle of the imaging portion relative to the inspection target reflected in the mirror portion, and an inspection portion configured to inspect the surface of the inspection target based on image data captured by the imaging portion.

According to a more preferable configuration, in the above-described configuration, the inspection portion distinguishes a defect and luminance unevenness on the surface of the inspection target based on a plurality of different pieces of image data captured with combinations of a plurality of different imaging angles formed by the adjustment portion and a plurality of different rotational positions adjusted by the rotational portion.

According to a more preferable configuration, in the above-described configuration, the inspection portion distinguishes the defect and the luminance unevenness on the surface of the inspection target after performing processing for causing the plurality of different pieces of image data to face the same direction.

According to further another preferable configuration, in any of the above-described configurations, the adjustment portion is a first posture adjustment portion configured to change a posture of the mirror portion relative to the inspection target.

According to a more preferable configuration, in the above-described configuration, the first posture adjustment portion changes an angle of the mirror portion relative to the inspection target and a position of the mirror portion relative to the inspection target.

According to further another preferable configuration, in any of the above-described configurations, the adjustment portion is a second posture adjustment portion configured to change a posture of the imaging portion relative to the mirror portion.

According to further another preferable configuration, in any of the above-described configurations, the adjustment portion is a third posture adjustment portion configured to change a posture of the rotational portion relative to the mirror portion.

According to further another preferable configuration, in any of the above-described configurations, the visual inspection apparatus further includes an illumination portion disposed coaxially with the imaging portion and configured to irradiate the surface of the inspection target with light.

According to further another preferable configuration, in any of the above-described configurations, the visual inspection apparatus further includes an illumination portion disposed at an angle with respect to an axis of the imaging portion and configured to irradiate the surface of the inspection target with light, a first polarizer disposed coaxially with the imaging portion, and a second polarizer disposed coaxially with the illumination portion.

According to further another preferable configuration, in any of the above-described configurations, the mirror portion includes a plurality of mirrors.

Further, from another aspect, an inspection method, according to one configuration thereof, is a visual inspection method for inspecting a surface of an inspection target. The visual inspection method includes an imaging step of causing an imaging portion to image the inspection target reflected in a mirror portion provided so as to reflect the inspection target in a state that the inspection target is placed on a rotational portion, and an inspection step of inspecting the surface of the inspection target based on a plurality of different pieces of image data captured with combinations of a plurality of different imaging angles formed by an adjustment portion and a plurality of different rotational positions adjusted by the rotational portion. The adjustment portion is configured to change an imaging angle of the imaging portion relative to the inspection target reflected in the mirror portion.

According to a more preferable configuration, in the above-described configuration, the inspection step includes distinguishing a defect and luminance unevenness on the surface of the inspection target.

According to a more preferable configuration, in the above-described configuration, the inspection step includes distinguishing the defect and the luminance unevenness on the surface of the inspection target after performing processing for causing the plurality of different pieces of image data to face the same direction.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-209096 filed on Dec. 17, 2020. The entire disclosure of Japanese Patent Application No. 2020-209096 filed on Dec. 17, 2020 including the specification, the claims, the drawings, and the abstract is incorporated herein by reference in its entirety.

REFERENCE SIGNS LIST 1 visual inspection apparatus
2 rotational table (rotational portion)
3 mirror (mirror portion)
31 first mirror (mirror portion)
32 second mirror (mirror portion)
33 third mirror (mirror portion)
4 front camera (imaging portion)
5 side camera (imaging portion)
6 control device (inspection portion)
7 illumination device (illumination portion)
8 first posture adjustment portion (adjustment portion)
8a first posture adjustment portion (adjustment portion)
9 second posture adjustment portion (adjustment portion)
10 third posture adjustment portion (adjustment portion)
11 first polarizer
12 second polarizer
W piston (inspection target)

The invention claimed is:

1. A visual inspection apparatus configured to inspect a surface of an inspection target, the visual inspection apparatus comprising:

a rotational portion configured to rotate in a state in which the inspection target is placed on the rotational portion;

a mirror portion provided so as to reflect the inspection target in the state in which the inspection target is placed on the rotational portion;

an imaging portion configured to image the inspection target reflected in the mirror portion;

an adjustment portion configured to change an imaging angle of the imaging portion relative to the inspection target reflected in the mirror portion; and an inspection portion configured to inspect a surface of the inspection target based on image data captured by the imaging portion, wherein the inspection portion distinguishes a defect and luminance unevenness on the surface of the inspection target based on a plurality of different pieces of image data, wherein each different piece of image data is captured at a different imaging angle from the other different pieces of image data and with the surface of the inspection target being oriented in a different rotational position from the other different pieces of image data, the different imaging angles of the plurality of different pieces of image data being formed by the adjustment portion, and the different rotational positions of the plurality of different pieces of image data being attained by adjustments of the rotational portion, and wherein the inspection portion distinguishes the defect and the luminance unevenness on the surface of the inspection target after performing processing for causing the plurality of different pieces of image data to be oriented in the same direction.

2. The visual inspection apparatus according to claim 1, wherein the adjustment portion is a first posture adjustment portion configured to change a posture of the mirror portion relative to the inspection target.

3. The visual inspection apparatus according to claim 2, wherein the first posture adjustment portion changes an angle of the mirror portion relative to the inspection target and a position of the mirror portion relative to the inspection target.

4. The visual inspection apparatus according to claim 1, wherein the adjustment portion is a second posture adjustment portion configured to change a posture of the imaging portion relative to the mirror portion.

5. The visual inspection apparatus according to claim 1, wherein the adjustment portion is a third posture adjustment portion configured to change a posture of the rotational portion relative to the mirror portion.

6. The visual inspection apparatus according to claim 1, further comprising an illumination portion disposed coaxially with the imaging portion and configured to irradiate the surface of the inspection target with light.

7. The visual inspection apparatus according to claim 1, further comprising:

an illumination portion disposed at an angle with respect to an axis of the imaging portion and configured to irradiate the surface of the inspection target with light;

a first polarizer disposed coaxially with the imaging portion; and a second polarizer disposed coaxially with the illumination portion.

8. The visual inspection apparatus according to claim 1, wherein the mirror portion includes a plurality of mirrors.

9. A visual inspection method for inspecting a surface of an inspection target, the visual inspection method comprising:

imaging the inspection target by causing an imaging portion to image the inspection target reflected in a mirror portion, the mirror portion being provided so as to reflect the inspection target in a state in which the inspection target is placed on a rotational portion which rotates the inspection target; and inspecting a surface of the inspection target based on a plurality of different pieces of image data, each different piece of image data being captured at a different imaging angle from the other different pieces of image data and with the surface of the inspection target being oriented in a different rotational position from the other different pieces of image data, the different imaging angles of the plurality of different pieces of image data being formed by an adjustment portion, and the different rotational positions of the plurality of different pieces of image data being attained by adjustments of the rotational portion, the adjustment portion being configured to change an imaging angle of the imaging portion relative to the inspection target reflected in the mirror portion, wherein the inspecting of the surface includes distinguishing a defect and luminance unevenness on the surface of the inspection target, and wherein the inspecting of the surface includes distinguishing the defect and the luminance unevenness on the surface of the inspection target after performing processing for causing the plurality of different pieces of image data to be oriented in the same direction.

\* \* \* \* \*